United States Patent [19]
Duck et al.

[11] Patent Number: 5,799,121
[45] Date of Patent: Aug. 25, 1998

[54] MULTI-PORT OPTICAL DEVICE

[75] Inventors: Gary S. Duck, Nepean; Yihao Cheng, Kanata, both of Canada

[73] Assignee: JDS Fitel Inc., Nepean, Canada

[21] Appl. No.: 800,061

[22] Filed: Feb. 14, 1997

[51] Int. Cl.$^6$ ............... G02B 6/26; G02B 6/32
[52] U.S. Cl. ............... 385/47; 385/34; 359/131
[58] Field of Search ............... 385/24, 31, 33, 385/47, 34; 359/131, 652

[56] References Cited

U.S. PATENT DOCUMENTS

| | | | |
|---|---|---|---|
| 4,474,424 | 10/1984 | Wagner | 385/24 |
| 4,486,071 | 12/1984 | Levinson | 385/34 |
| 4,521,071 | 6/1985 | Bohm | 385/34 |
| 4,550,975 | 11/1985 | Levinson et al. | 385/34 |
| 5,555,330 | 9/1996 | Pan et al. | 385/39 |
| 5,612,824 | 3/1997 | Si et al. | 359/652 |

*Primary Examiner*—Hemang Sanghavi
*Attorney, Agent, or Firm*—Neil Teitelbaum & Associates

[57] ABSTRACT

An optical device is provided having an input and an output terminal spaced equidistant from an optical axis of a graded index lens. An at least partially reflective surface is disposed spaced but adjacent from another end face of the graded index lens. The optical path length from the input or output terminal to a first end face of the lens is equal to the optical path length from the other end face of the lens to the at least partially reflective surface. The graded index lens has a length that collimates light launched from the input terminal to the at least partially reflective surface. Moving the input an output terminals toward or away from one another changes the angle at which light exits the other end face of the graded index lens, and thus changes the angle at which light is incident upon the at least partially reflecting surface. Conveniently, if the at least partially reflecting surface is a WDM interference filter, tunability of the filter is achieved by moving the input an output terminals toward or away from one another.

18 Claims, 3 Drawing Sheets

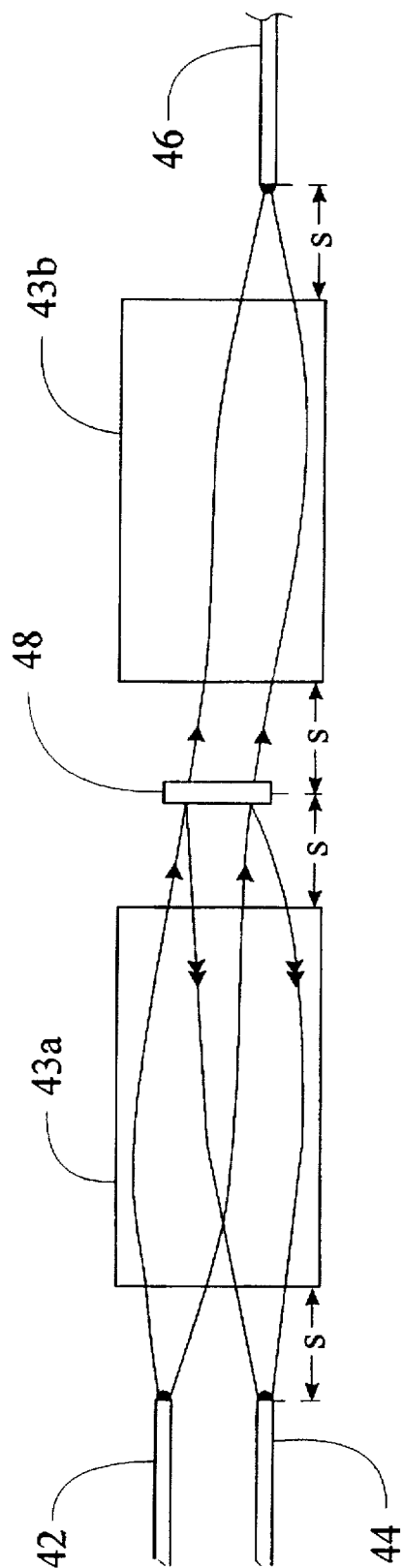
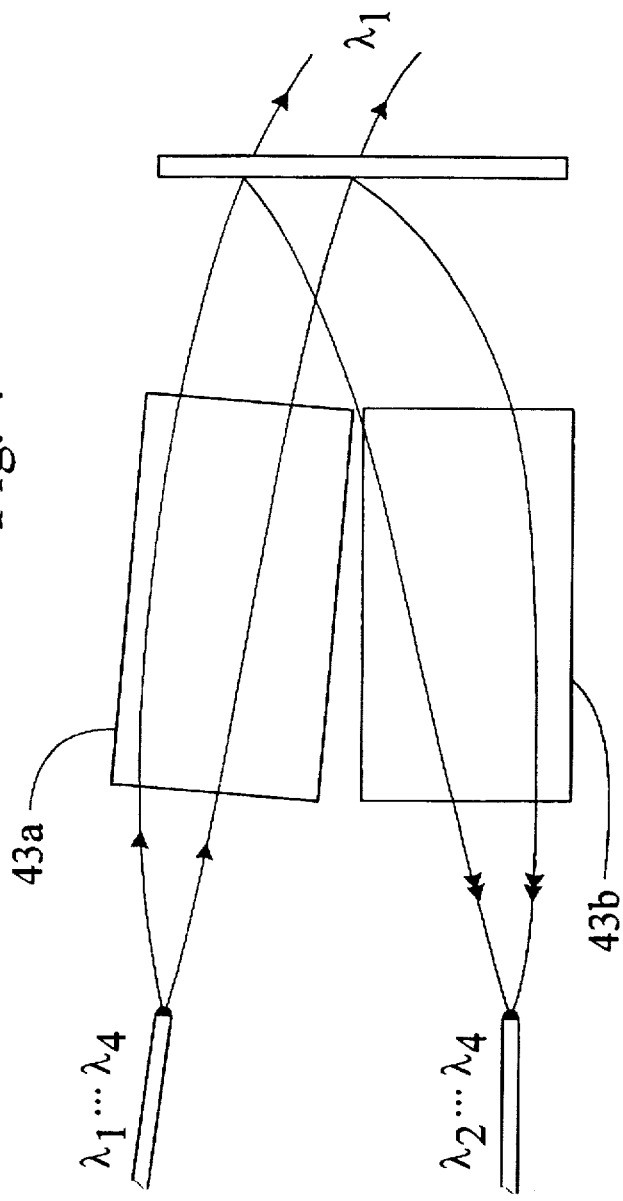
Fig. 4
Fig. 5

5,799,121

1
MULTI-PORT OPTICAL DEVICE

FIELD OF THE INVENTION

This invention relates generally to an optical device that uses a graded index lens to direct light towards an optical element; more particularly, in a preferred embodiment, the invention relates to a multi-port optical filtering device.

BACKGROUND OF THE INVENTION

There have been many attempts to develop compact, high precision, low tolerance optical filters centered at predetermined wavelengths for application in areas such as spectroscopy, optical networks and optical links, and more particularly optical communication systems. Optical filters are some of the most ubiquitous of all passive optical components found in most optical communication systems. One use of optical filters is in the field of optical communications where only a signal of a predetermined wavelength is to be passed.

Although this invention is particularly useful with narrow band optical filters, it is not limited to filters which pass only a very narrow band of light (e.g. ±0.2 nanometers or less) centered at a predetermined wavelength; however, since such filters are extremely difficult to make and consequently relatively expensive to manufacture the applicability of this invention for the narrow band is evident. One known means for providing a selective, narrow band, optical filter, is by utilizing a wavelength selective interference filter element whose wavelength characteristic depends on the angle of incidence. Thus, by varying the angle of light incident upon the interference filter, the wavelength of the light that is passed by the filter varies. Such a filter element is described in U.S. Pat. 5,331,651 issued Jul. 19, 1994 and assigned to the Hewlett-Packard Company. Another filter of this type is described in allowed U.S. patent application Ser. No. 08/442,365 in the name of Si assigned to JDS Fitel Inc. of Canada.

Conventional optical interference filters commonly comprise a pair of collimating graded index (GRIN) lenses having an interference coating or an interference filter sandwiched between the collimating end faces of the lenses. Such a system requires two GRIN lenses and customarily, the use of a refractive index matching epoxy to glue input and output optical fibers to the lenses. Furthermore, index matching epoxy is used to glue the collimating end faces of the lenses to the optical filter.

This structure in accordance with this invention obviates using an adhesive between a GRIN lens and optical fibers or optical elements, as this invention relies on having a gap between the lens and adjacent optical elements.

In is therefore an object of this invention to provide a compact optical device that uses a single GRIN lens for filtering an optical signal.

It is a further object of this invention to provide an at least 3-port tunable optical filter.

SUMMARY OF THE INVENTION

In accordance with the invention, an optical device is provided comprising a GRIN lens having an first end face and a second end face, an input port disposed at a first location adjacent the first end face, an output port disposed at a second location, adjacent the first end face, an at least partially reflective surface disposed at a third location adjacent the second end face of the GRIN lens, wherein the optical distance between the input port and the first end face 2
of the GRIN lens is substantially the same as the optical distance from the second end face of the GRIN lens and the at least partially reflective surface.

BRIEF DESCRIPTION OF THE DRAWINGS

Exemplary embodiments of the invention will now be described in conjunction with the drawings in which:

FIG. 4 is an embodiment of a 3-port WDM narrow band filter in accordance with this invention.

FIG. 5 is an alternative embodiment of a 3-port WDM narrow band filter using a pair of GRIN lenses disposed side-by-side;

DETAILED DESCRIPTION

Figure 1:
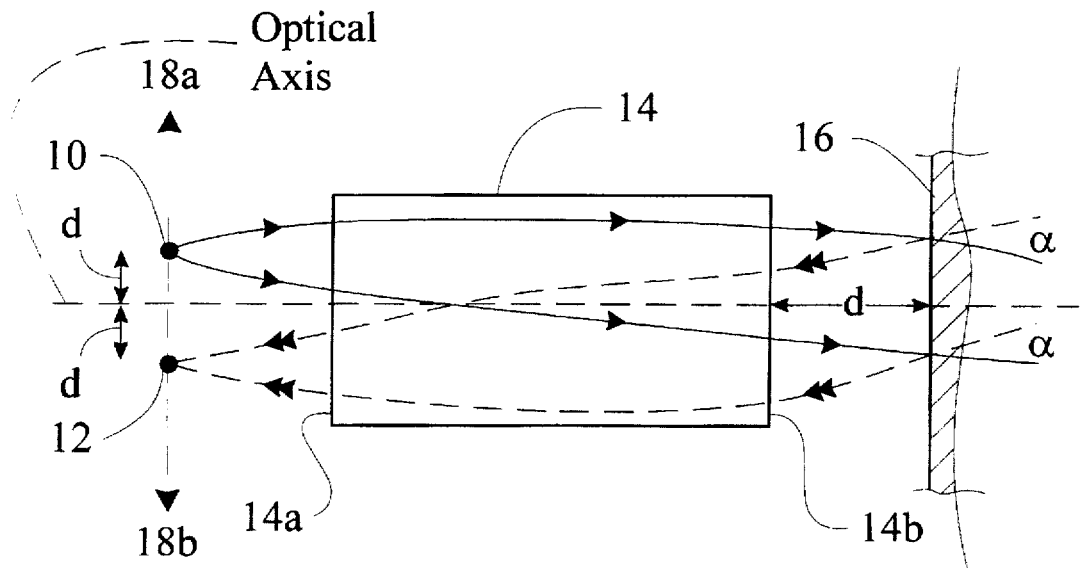
FIG. 1 is a side view of a beam of light launched into a GRIN lens and directed toward a reflective surface.

Turning now to FIG. 1, an optical system is shown according to the invention wherein a GRIN lens 14, is disposed between input and output ports 10 and 12, and a reflective surface 16. The input port 10 and the output port 12 are both disposed a distance "d" on opposite side of an imaginary line (shown as a dotted line) that extends from the optical axis of the GRIN lens 14. The optical path length from the input port 10 to the input end face 14a of the GRIN lens 14 is the same as the optical path length from the output end face 14b of the GRIN lens 14 to the reflective surface 16. Furthermore the GRIN lens is of a length (less than 0.25 pitch) that ensures that light launched into the input port 10 directed through the lens 14, is substantially collimated at the reflective surface 16 a distance from the end face of the lens. This ensures that light reflecting backwards along the path indicated by the dotted line will be substantially focused at the output port 12.

In operation, light launched into the input port 10 follows a path shown and indicated by the solid line ending at the surface 16 as a collimated beam. Since the input port is offset from the optical axis of the lens 14, the light arriving at the surface 16 is incident upon the surface at an angle α. Similarly the light reflecting from the surface reflects with a same angle. As the position of the input and output ports changes, in a direction of arrows 18a and 18b, the angle of incidence upon the reflective surface 16, becomes steeper. Thus varying the position of the input ports in this manner varies the angle of incidence of the beam upon the surface 16. However, as the angle of incidence is changed, the beam of light incident upon the surface 16 essentially remains in the same location and is confined to a small area relative to the size of the end face of the GRIN lens 14. When the reflecting surface 16 is a wavelength selective interference filter whose wavelength characteristic depends on the angle of incidence; by varying the angle of light incident upon the interference filter, the wavelength of the light that is passed (or reflected) by the filter varies.

Figure 2:
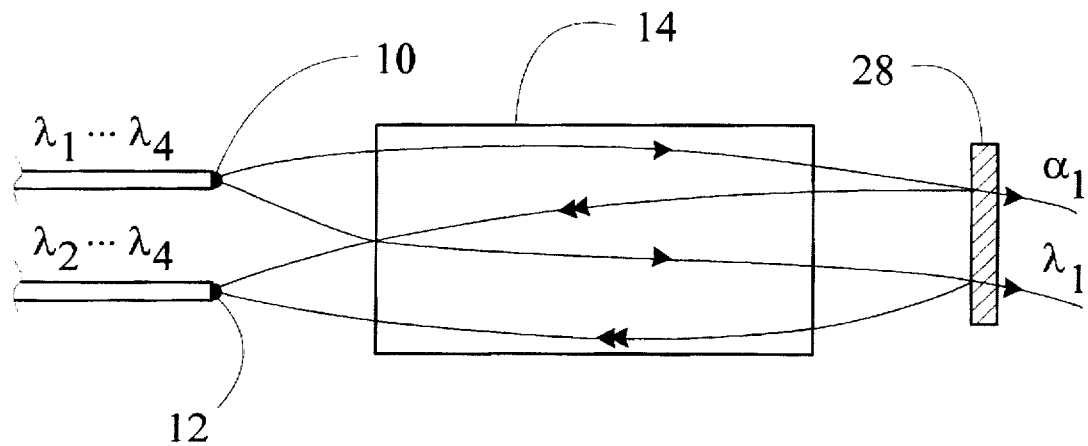
FIG. 2 is a side view of a WDM filter shown with a single GRIN lens.

Referring now to FIG. 2, a 3-port wavelength division multiplex (WDM) filter 28 is shown. Light of wavelengths λ1 to λ4 is launched into the input port 10 as a composite beam of light. When the beam is incident upon the filter at an angle $\alpha_i$, light of wavelengths λ2 to λ4 are reflected and λ1 is passed. As the input ports are moved further from the optical axis, the transmission band is moved and light of wavelength λ2 is then parsed. Thus the filter is tunable. This tunability may be used in dynamic sense, by a means capable of moving the input and output ports simultaneously in a same direction toward or away from the optical axis. Alternatively, the filter may be tuned in a more static sense, during manufacturing, to achieve a particular response, after which the position of the ports can be fixed with an adhesive.

Figure 3:
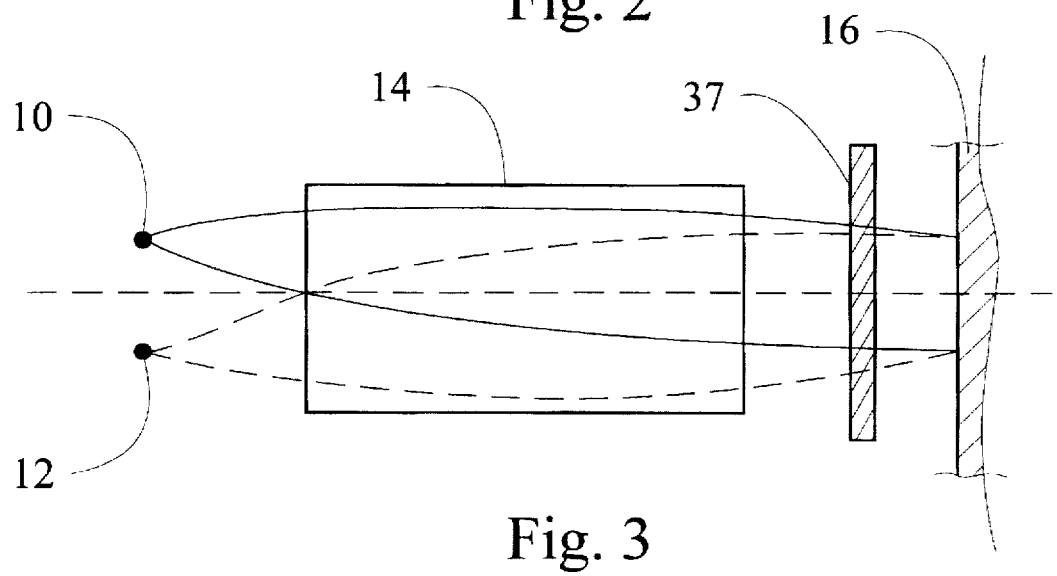
FIG. 3 is a is a side view of an alternative embodiment of a WDM filter having a filter element disposed in front of a reflective surface.

FIG. 3 shows an alternative embodiment wherein a wide band filter 37 is placed in front of the reflective surface 16.

In FIG. 4 a 3-port WDM system is shown wherein a pair of GRIN lenses 43a and 43b are provided having a narrow band WDM filter element 48 disposed between and separated from the lenses by an optical path length "s". The input and output ports are similarly spaced from their adjacent lens faces by the same optical path length "s". The lenses 43a and 43b are selected such that they collimate light at the filter element 48 launched into them at the input or output ports. Optical fiber 42, 44, and 46 provide input and output ports respectively. Conveniently, the narrow band WDM filter element 48 can be considerably smaller than the size of the end face of the GRIN lens. This is particularly advantageous since larger WDM filters such as the type that are often glued I 0 directly to and between a pair of GRIN lenses are more costly and difficult to manufacture due to their large size.

Referring now to FIG. 5, a WDM filter is shown wherein two GRIN lenses are shown side-by-side. In some instances this arrangement is preferred to that shown in FIGS. 2 or 4, as it facilitates easy placement of the input and output fibres without overcrowding. For example if the input and output ports, in FIGS. 2 or 4 are very close to the optical axis, placement of two fibres close to one another may be difficult. FIG. 5 provides an alternative arrangement.

Figure 6:
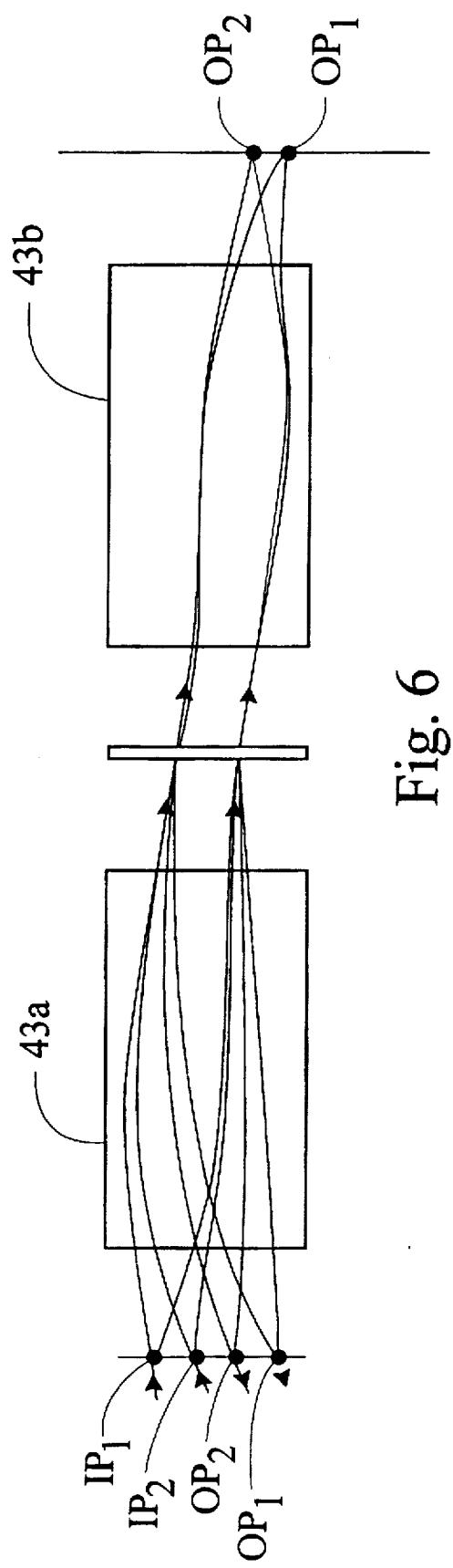
FIG. 6 is a an alternative embodiment of a 6 port WDM similar to that shown in FIG. 4; and, FIG. 7 is an alternative embodiment to that shown in FIG. 2, where the reflective surface is tilted with respect to the end face of the GRIN lens.

A six port filter is shown if FIG. 6, wherein two input ports IP1, IP2, and two output ports OP1 and OP2 are disposed adjacent an input end face GRIN lens 43a. Other output ports OP1 and OP2 are disposed adjacent the output face of the GRIN lens 43b. Although 6 ports are shown on this device, additional ports may be included provided there is sufficient space to place the input and output optical fibres (not shown) at the ports.

Figure 7:
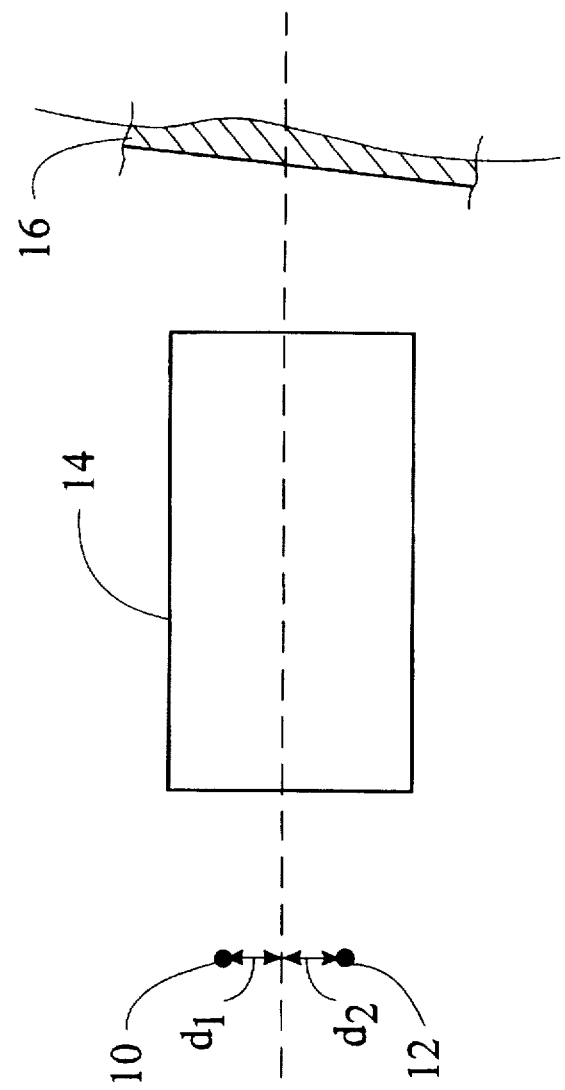

Referring now to FIG. 7 an embodiment is shown that is similar to the one shown if FIG. 2. However, in FIG. 7 the at least partially reflective surface 16 is tilted at a small angle. In accordance with this tilt, the input and output ports are located at different distances from the optical axis of the GRIN lens 16.

What we claim is:

1. An optical device comprising:

a GRIN lens having a first end face and a second end face;

an input port disposed at a first location adjacent to and spaced from the first end face;

an output port disposed at a second location, adjacent to and spaced from the first end face;

an at least partially reflective surface disposed at a third location adjacent to and spaced from the second end face of the GRIN lens, wherein the optical distance between the input port and the first end face of the GRIN lens is substantially the same as the optical distance from the second end face of the GRIN lens and the at least partially reflective surface.

2. An optical device as defined in claim 1, wherein the optical distance between the output port and the first end face of the GRIN lens is substantially the same as the optical distance from the second end face of the GRIN lens and the at least partially reflective surface.

3. An optical device as defined in claim 2, wherein the output port is not adhesively coupled with the first end face of the GRIN lens, and wherein the at least partially reflective surface is not adhesively coupled with the second end face of the GRIN lens.

4. An optical device as defined in claim 1, wherein the GRIN lens has a length that will substantially collimate an incident beam launched into the input port at the at least partially reflecting surface.

5. An optical device as defined in claim 4 wherein the at least partially reflecting surface is a completely reflecting mirror.

6. An optical device as defined in claim 4 wherein the at least partially reflecting surface is a WDM interference filter having an output characteristic that varies with an angle of incident light.

7. An optical device as defined in claim 1, wherein the GRIN lens is of a length that is of a length that is other than a quarter pitch or multiple thereof.

8. An optical device as defined in claim 1, wherein the at least partially reflective surface has surface area that is substantially less than the surface area of the second end face of the GRIN lens with which it is optically coupled.

9. An optical device comprising:

a GRIN lens having a first end face, a second end face, and an optical axis extending through its centre;

an input and an output port, spaced on different sides of a path extending from the optical axis of the GRIN lens, the ports being spaced from and substantially equidistant from the first end face of the GRIN lens; and, an interference filter having an output characteristic that varies with an angle of incident light, said filter being spaced from the second end face of the GRIN lens and wherein light launched into the input port is collimated by the GRIN lens at the filter, and wherein the distance from the filter to the second end face of the GRIN lens is substantially the same as the distance from the first end face of the GRIN lens to one of the ports.

10. An optical device as defined in claim 9, wherein the GRIN lens is less than a quarter pitch lens.

11. An optical device as defined in claim 9, wherein the interference filter has a signal receiving surface area that is substantially less than the surface area of the second end face of the GRIN lens to which it is optically coupled.

12. An optical device comprising:

a first GRIN lens having an first end face and a second end face;

an input port disposed at a first location adjacent to and spaced from the first end face;

an at least partially reflective surface disposed at a third location adjacent to and spaced from the second end face of the first GRIN lens, wherein the optical distance between the input port and the first end face of the first GRIN lens is substantially the same as the optical distance from the second end face ofthe first GRIN lens and the at least partially reflective surface; and, an output port disposed at a second location, adjacent to and spaced from the first input port for receiving light launched into the input port that has propagated through the first GRIN lens from the at last partially reflective surface.

13. An optical device as defined in claim 12, further comprising a second GRIN lens disposed between the output port and the at least partially reflecting surface, to focus light received from the at least partially reflecting surface at the output port.

14. An optical device as defined in claim 13, further comprising a third GRIN lens disposed adjacent to and spaced from the at least partially reflecting surface for directing light that has transmitted through the at least partially reflecting element to a second output port.

15. An optical device as defined in claim 14, wherein an optical distance from an end face of the second GRIN lens to the at least partially reflecting surface is approximately the same as the optical distance from an end face of the third GRIN lens to the at least partially reflecting surface.

16. An optical device as defined in claim 15, wherein the optical distance from an end face of the second GRIN lens to the at least partially reflecting surface is approximately the same as the optical distance from an end face of the first GRIN lens to the at least partially reflecting surface.

17. An optical device as defined in claims 12, wherein the first GRIN lens is of a length that is of a length that is other than a quarter pitch or multiple thereof.

18. An optical device as defined in claim 12, wherein the at least partially reflective surface has surface area that is substantially less than the surface area of the second end face of the GRIN lens with which it is optically coupled.

* * * * *